United States Patent [19]

Massey, Jr.

[11] 4,054,979
[45] Oct. 25, 1977

[54] VALVE CONSTRUCTION AND METHOD OF MAKING THE SAME

[75] Inventor: Arie F. Massey, Jr., Lenoir City, Tenn.

[73] Assignee: Robertshaw Controls Company, Richmond, Va.

[21] Appl. No.: 715,927

[22] Filed: Aug. 19, 1976

Related U.S. Application Data

[62] Division of Ser. No. 490,589, July 22, 1974, Pat. No. 3,990,680.

[51] Int. Cl.² ............... B23P 15/00; F16K 27/02
[52] U.S. Cl. ............................................. 29/157.1 R
[58] Field of Search ............ 29/157.1 R; 251/335 B, 251/335 R, 335 A, 366, 284, 318, 360, 319, 323, 333, 215-227; 137/533.17, 533.19, 533.21, 533.29, 543.21, 543.13, 543.23, 329.01, 330, 331, 385

[56] References Cited

U.S. PATENT DOCUMENTS

| | | | |
|---|---|---|---|
| 333,941 | 1/1886 | Frisbie | 137/533.19 |
| 1,174,959 | 3/1916 | Bean | 251/223 |
| 1,774,994 | 9/1930 | Pfoutz | 251/284 |
| 1,859,834 | 5/1932 | May | 251/335 B |
| 2,059,991 | 11/1936 | Goehring | 251/318 |
| 2,321,597 | 6/1943 | Hobbs | 137/533.31 |
| 2,678,846 | 5/1954 | Rogers et al. | 251/284 |
| 2,846,182 | 8/1958 | Charlton | 251/318 |
| 3,027,916 | 4/1962 | Smith | 251/335 R |
| 3,193,247 | 7/1965 | Pool et al. | 137/543.21 |
| 3,206,165 | 9/1965 | Salmon et al. | 251/335 R |
| 3,605,793 | 9/1971 | Kinsel | 251/333 |
| 3,787,023 | 1/1974 | Shufflebarger et al. | 251/335 B |
| 3,851,853 | 12/1974 | Teeters | 251/330 |

Primary Examiner—C.W. Lanham
Assistant Examiner—Daniel C. Crane
Attorney, Agent, or Firm—Candor, Candor & Tassone

[57] ABSTRACT

A valve construction having a housing provided with an inlet and an outlet interconnected together by a valve seat of the housing carries a movable valve member for opening and closing the valve seat, the valve member having an elongated valve stem extending from one side thereof. The housing has axially spaced guides to provide the sole means for guiding axial movement of the valve stem, the valve stem having a guide collar thereon disposed closely adjacent the valve member and cooperating with one of the guides of the housing. Such guide collar is also utilized as a stop means for limiting axial movement of the valve member in one direction of movement thereof.

2 Claims, 8 Drawing Figures

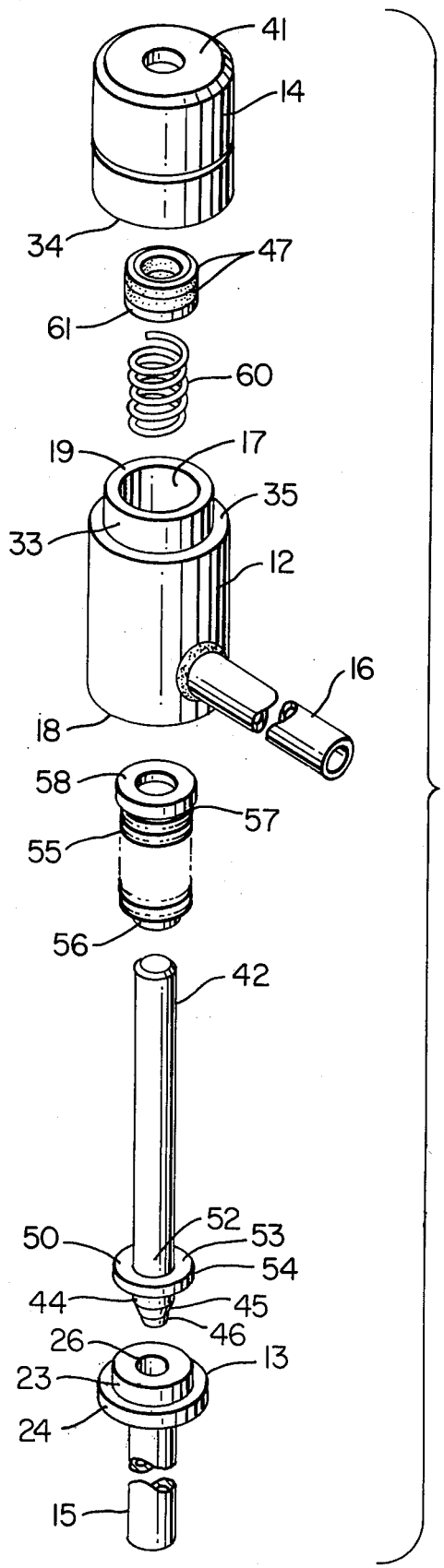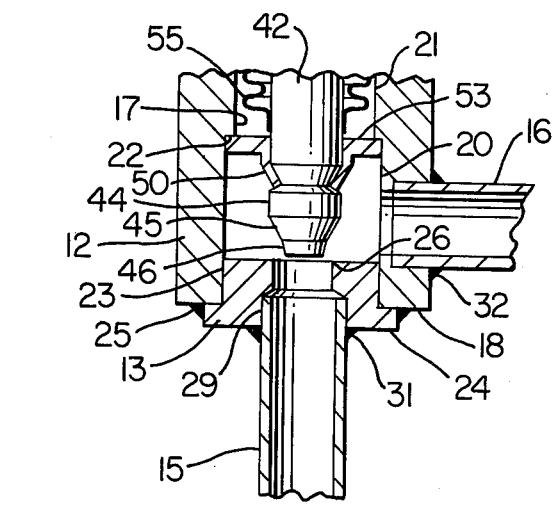
FIG. 4
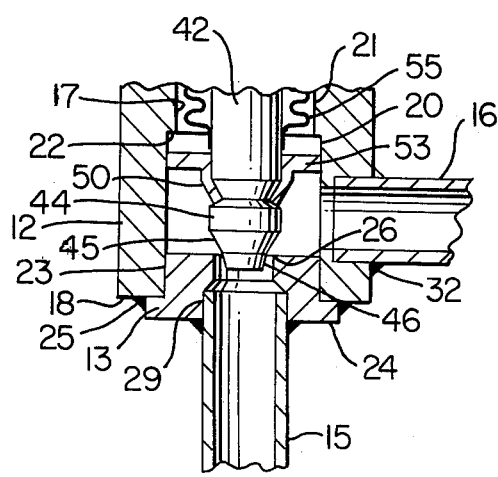
FIG. 3

4,054,979

VALVE CONSTRUCTION AND METHOD OF MAKING THE SAME

This application is a divisional application of its co-pending parent application Ser. No. 490,589, filed July 22, 1974, now U.S. Pat. No. 3,990,680.

This invention relates to an improved valve construction as well as to an improved method of making such a valve construction or the like.

It is well known that various valve constructions have been provided in the past wherein each comprises a housing having an inlet and an outlet interconnected together by a valve seat that is opened and closed by a valve member movably carried by the housing and having a valve stem thereof projecting out of the housing to be interconnected to an actuator therefor. When such valve construction is utilized for fluid flow control purposes, not only must sealing means be provided for sealing the movable valve stem of the valve member to the housing, but also means must be provided so that the external actuator can be utilized for effectively and accurately moving such valve member between its operating positions.

Accordingly, it is a feature of this invention to provide an improved valve construction having improved means for guiding movement of the valve member relative to its valve seat.

Another feature of this invention is to provide such a valve construction wherein improved fluid sealing means are provided for the movable valve stem of the valve member thereof.

Another feature of this invention is to provide an improved valve construction that has the aforementioned features and is still adapted to be formed from a relatively few parts in a unique and simple manner.

In particular, one embodiment of this invention provides a valve construction having a housing means provided with an inlet and an outlet interconnected together by a valve seat of the housing means. A movable valve member is carried by the housing means for opening and closing the valve seat, the valve member having an elongated valve stem extending from one side thereof and projecting from the housing means to be operatively interconnected to an actuator therefor. The housing means has axially spaced guide means to provide the sole means for guiding axial movement of the valve stem. The valve stem has a guide collar means thereon disposed closely adjacent the valve member and cooperating with one of the guide means of the housing means to provide for accurate guiding of the valve member close to the valve seat. A bellows construction is utilized as a primary fluid seal means for the valve stem and packing gland means is utilized as a secondary fluid seal means for the valve stem as well as for providing part of the guide means for the valve stem.

Accordingly, it is an object of this invention to provide an improved valve construction having one or more of the novel features set forth above or hereinafter shown or described.

Another object of this invention is to provide a method for making such a valve construction or the like, the method of this invention having one or more of the novel features set forth above or hereinafter shown or described.

Other objects, uses and advantages of this invention are apparent from a reading of this description which proceeds with reference to the accompanying drawings forming a part thereof and wherein:

FIG. 3 is a fragmentary view similar to FIG. 2 and illustrates the valve construction in one of its open conditions.

FIG. 4 is a view similar to FIG. 3 and illustrates the valve construction in its fully opened position.

FIG. 5 is an exploded perspective view of various parts of the valve construction of FIG. 2.

Figure 1:
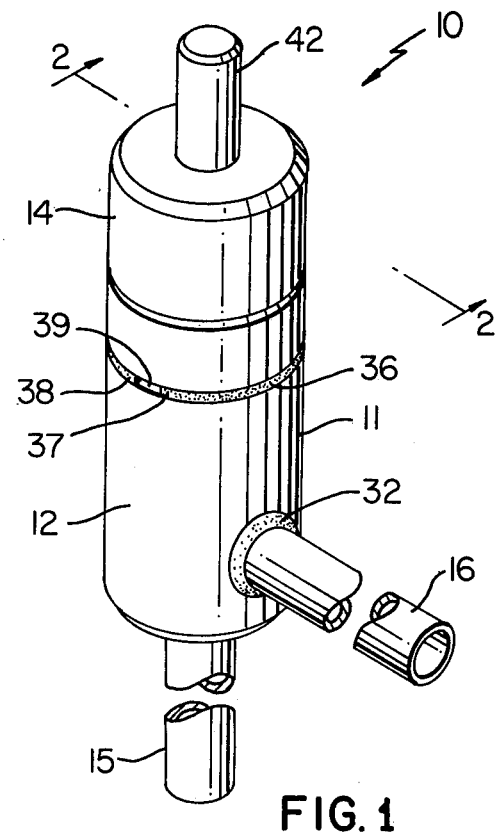
FIG. 1 is a perspective view of the improved valve construction of this invention.

While the various features of this invention are hereinafter described and illustrated as being particularly adapted to provide a high quality, bellows sealed steam flow control valve, it is to be understood that the various features of this invention can be utilized singly or in any combination thereof to provide a valve construction for other purposes as desired.

Therefore, this invention is not to be limited to only the embodiments illustrated in the drawings, because the drawings are merely utilized to illustrate one of the wide variety of uses of this invention.

Figure 2:
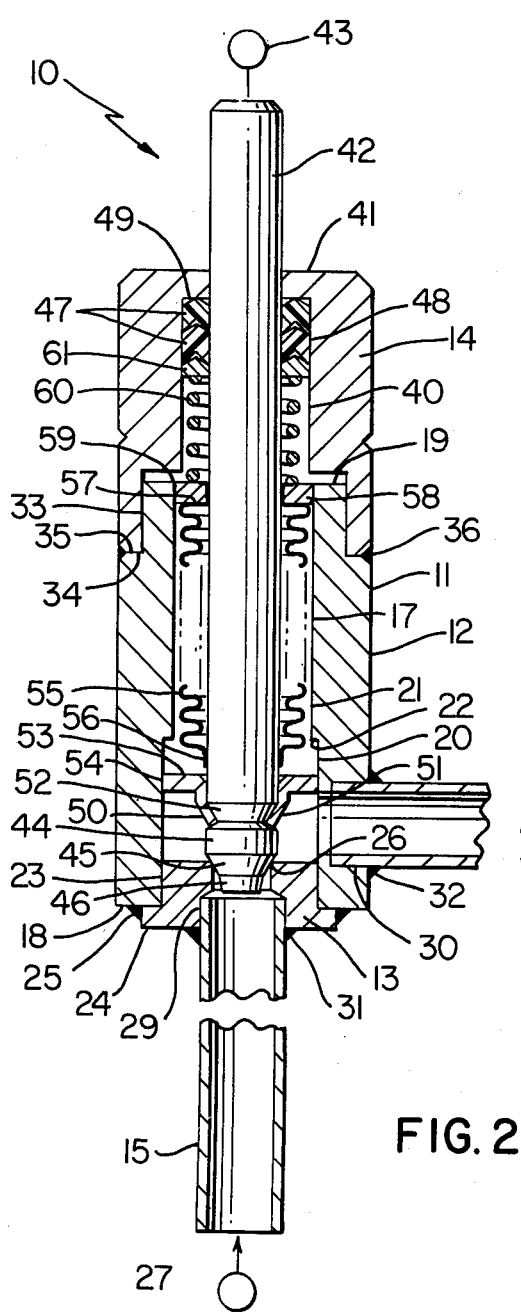
FIG. 2 is an enlarged cross-sectional view taken on line 2—2 of FIG. 1.

Referring now to FIGS. 1 and 2, the improved valve construction of this invention is generally indicated by the reference numeral 10 and comprises a housing means 11 formed from a housing body 12, valve seat ring 13, end cap 14, inlet tube 15 and outlet tube 16 all formed of suitably machined metallic material and welded together to form the sealed housing means 11 illustrated in FIG. 2.

The valve body 12 has a stepped cylindrical bore 17 passing through the opposed ends 18 and 19 thereof, the bore 17 having an enlarged section 20 interconnected to a reduced section 21 by an internal annular shoulder 22 that forms part of a stop means as will be apparent hereinafter.

The valve seat ring 13 has a cylindrical projection 23 that is received in the bore portion 20 of the valve body 12 and has a disc-like end 24 abutting against the end 18 of the valve body 12 to be welded thereto by annular weld means 25 that completely seals the valve seat ring 13 to the valve body 12 and thereby closes the end 18 thereof.

The valve seat ring means 13 has a cylindrical valve seat 26 that is disposed in fluid communication with the inlet pipe or tube 15 and is adapted to be disposed in fluid communication with the bore portion 20 of the valve body 12 which leads to the outlet tube 16 whereby when the valve seat 26 is opened in a manner hereinafter described, a suitable fluid source 27 that is interconnected to the inlet tube 15 is adapted to be interconnected through the opened valve seat 26 to a fluid receiving device 28 fluidly interconnected to the outlet tube 16.

The inlet tube 15 and outlet tube 16 are respectively inserted in openings 29 and 30 formed respectively in the valve seat ring means 13 and valve body 12 and sealed and secured thereto by annular weld means 31 and 32.

The valve body 12 is provided with a reduced cylindrical section 33 at the upper end 19 thereof whereby the end cap 14 is adapted to have its lower end 34 telescoped over the reduced section 33 of the valve body 12 to abut against an annular shoulder 35 thereof and be secured thereto by an annular weld seam 36. However, the weld seam 36 has a beginning end 37, FIG. 1, and an ending end 38, or vice versa, which leaves a small gap 39 therebetween which, in effect, is in fluid communication with a stepped bore 40 that interrupts the end 34 of the end cap 14 for seal leakage detection purposes as will be apparent hereinafter.

The stepped bore 40 of the end cap 14 also interrupts the closed end wall 41 of the end cap 14 and out through which an elongated valve stem 42 telescopically projects to be operatively interconnected to an operator or actuator 43 that will cause axial movement of the valve stem 42 relative to the housing means 11 and, thus, cause movement of a valve member 44, that is formed internally at the lower end 52 of the valve stem 42, relative to the valve seat 26 for controlling fluid flow therethrough.

In particular, the valve member 44 is so constructed and arranged that the same has a frustoconical portion 45 adapted to be received in the valve seat 26 and is provided with a smaller frustoconical guide end portion 46 to facilitate the insertion of the valve member 44 in the valve seat 26 when the same is moved relative to the valve seat 26 in the manner illustrated in FIGS. 3 and 4.

Thus, by positioning the valve member 44 relative to the valve seat 26 anywhere intermediate its fully closed position of FIG. 2 and its fully open position of FIG. 4, such as the position illustrated in FIG. 3, it can be seen that a throttled fluid flow through the valve seat 26 can be provided whereby the actuator 43 can determine and maintain a desired amount of fluid flow from the source 27 to the fluid receiver 28 in a manner well known in the art.

In order to guide such axial movement of the valve member 44 and, thus, axial movement of the valve stem 42 relative to the housing means 11, a plurality of V-ring resilient packing members 47 formed of any suitable material, such as suitable plastic bearing material, are disposed in the intermediate part 48 of the stepped bore 40 of the end cap 14 in stacked relation against the inside surface 49 of the end wall 41 in a manner hereinafter described to not only provide guide means for the upper end of the valve stem 42, but also to provide fluid sealing means against the valve stem 42 to tend to prevent any fluid in the housing 11 from passing out of the stepped bore 40 at the upper end of the valve stem 42.

However, the packing members 47 provide a secondary sealing means for the valve stem 42 as will be apparent hereinafter.

The bore section 20 of the stepped bore 17 of the valve body 12 provides a lower guide for the lower end 52 of the valve stem 42 as the lower end 52 of the valve stem 42 carries a guide collar means 50 that includes a tubular portion 51 secured to and mating with the lower end 52 of the valve stem 42 and an outer disc-like part 53 that has its outer peripheral edge 54 disposed in sliding engagement with the portion 20 of the stepped bore 17 of the valve body 12 to provide guiding movement of the lower end 52 of the valve stem 42 relative to the housing means 11 closely adjacent the valve member 44 and thereby accurately hold the valve member 44 relative to the valve seat 26 to provide for accurate control of the amount of fluid flow through the valve seat 26 for each setting of the valve stem 42 by the actuator 43.

A metallic tubular bellows construction 55 is utilized as a primary fluid seal for the valve stem 42 and the housing means 11 downstream from the valve seat 26 to seal the end cap 14 from the valve seat 26 in advance of the secondary seal means 47.

In particular, the bellows construction 55 has a lower extruded end 56 welded to the lower end 52 of the valve stem 42 while an upper end 57 of the bellows construction 55 is secured by welding or means to a metallic ring 58 that is disposed in the bore section 21 at the upper end 19 of the valve body 12 and welded or otherwise secured thereto at their juncture 59 to seal the upper end 57 of the bellows construction 55 to the valve body 12.

In this manner, the valve stem 42 can move axially upwardly and downwardly relative to the housing means 11 as the bellows construction 55 will compress or stretch in the manner illustrated in FIGS. 2 and 4 to permit such axial movement of the stem 42 under the operation of the actuator 43 with the bellows construction 55 still performing its fluid sealing function to prevent fluid flow from the valve seat 26 from reaching the end cap 14.

Thus, it can be seen that the gap 39 in the annular weld 36 between the end cap 14 and valve body 12 is disposed in fluid communication with the bore 40 in the end cap 14 intermediate the bellows construction 55 and the sealing means 47 so that any fluid leakage through the malfunctioning bellows construction 55 can be sensed at the gap 39 by suitable means (not shown) before the secondary sealing means 47 would likewise malfunction.

In order to maintain the V-ring members 47 in sealing engagement with the valve stem 42, a compression spring 60 is disposed between the secured ring 58 and a washer-like member 61 that engages against the lower V-ring sealing member 47 whereby the V-ring members 47 are held under compression in stacked relation by the spring 60.

Thus, it can be seen that the valve construction 10 of this invention can be formed of relatively few parts that can be assembled in the unique manner illustrated to operate in a manner now to be described.

When the operator or actuator 43 determines that no fluid flow should take place between the fluid source 27 and the fluid receiving device 28, the actuator 43 causes the valve stem 42 to move downwardly in FIGS. 3 or 4 to place the valve member 44 firmly against the valveseat 26 to close off the valve seat 26 as illustrated in FIG. 2.

However, when the actuator 43 determines that a certain fluid flow should be provided from the source 27 to the fluid receiving means 28, the same causes the valve stem 42 to move axially upwardly to a position that provides the desired fluid flow through the open valve seat 26 in substantially the manner illustrated in FIG. 3 whereby proportional fluid flow through the valve seat 26 can be provided by the valve construction 10.

Should the operator 43 cause the valve stem 42 to move upwardly to too great an extent, the guide collar 50 of the valve stem 42 will abut against the annular shoulder 22 of the valve body 12 in the manner illustrated in FIG. 4 to thereby limit movement of the valve stem 42 in a valve seat opening direction whereby it can be seen that the guide collar 50 provides a dual function, namely, guides axial movement of the valve stem 47 closely adjacent the valve member 44 to provide for accurate fluid flow through the valve seat 26 and provides a stop means for limiting axial movement of the valve stem 42 in a valve seat opening direction.

In this manner, it is believed that the valve body 11 and valve stem 42 can be made shorter than in the past, which will substantially reduce material costs.

Also, the valve body can be made from tubing and thereby result in less material and less machining time.

For example, the valve body 12 can be machined in one machine sequence on an automatic screw machine to provide for better alignment of the functional surfaces thereof.

Also, the guiding surfaces 20 and 54 of the housing means 11 are relatively large and thereby reduce the amount of wear that the same take during the operation of the valve construction 10.

Also, it is believed that by combining the guide collar means 50 as a guide means and a stop for the valve stem 42, an extra part can be eliminated for the valve construction 10 of this invention.

Thus, the valve body 12 of the valve construction 10 os this invention can be manufactured from heavy wall tubing material, such as stainless steel types 304, 309 or 316, so that a minimum amount of machining is required as castings or bar stock material require extensive machining thereof to form similarparts.

The valve stem 42 and valve member 44 can be formed of hardened 17-4 PH stainless steel to withstand high pressure steam while requiring a minimum amount of machining thereof.

The valve construction 10 can be assembled by having the bellows construction 55 and stem assembly 42 inserted from the bottom 18 of the valve body 12 and thereby allow the internal stop and guide means 50 of the stem 42 to be combined into one part so that fewer parts are required to accomplish the previously described features of the valve construction 10.

The valve seat ring 13 can be first machined on the seat side 26 thereof with the seat 26, port diameter and shoulder 23 which engages the valve body 12 being machined in one chucking operation that maintains perfect alignment. The countebore for the inlet tube 15 is not critical and can be machined in a secondary operation.

The valve body 12 can be machined from the inlet end 18 thereof where the end 18 and counterbore 17 for the guide and stop collar 50 are machined. The shoulder 33 at the top 19 of the valve body 12 can also be finished in the same chucking, again with perfect alignment of the functional surfaces being maintained.

The end cap 14 can be machined from the end 34 thereof which assures alignment of the shoulder end 34 thereof that fits over the valve body 12.

Thus, the length of the valve stem 42 and valve body 12 are reduced because the stop and guide means is combined at one end of the bellows construction 55 and the stop shoulder 22 of the valve body 12 may actually be disposed opposite the corrugations of the bellows construction 55 when the valve member 55 is in the closed position, if desired.

While the previously described valve construction 10 is particularly adapted to be utilized as a throttle valve for the speed control of a steam powered electrical alternator where the throttle valve will be part of a closed loop fedback control system which is intended to maintain nearly constant alternator frequency as the electrical load is varied from 0% to 100%, it is to be understood that the valve construction 10 can be utilized for other purposes, as desired.

Figure 6:
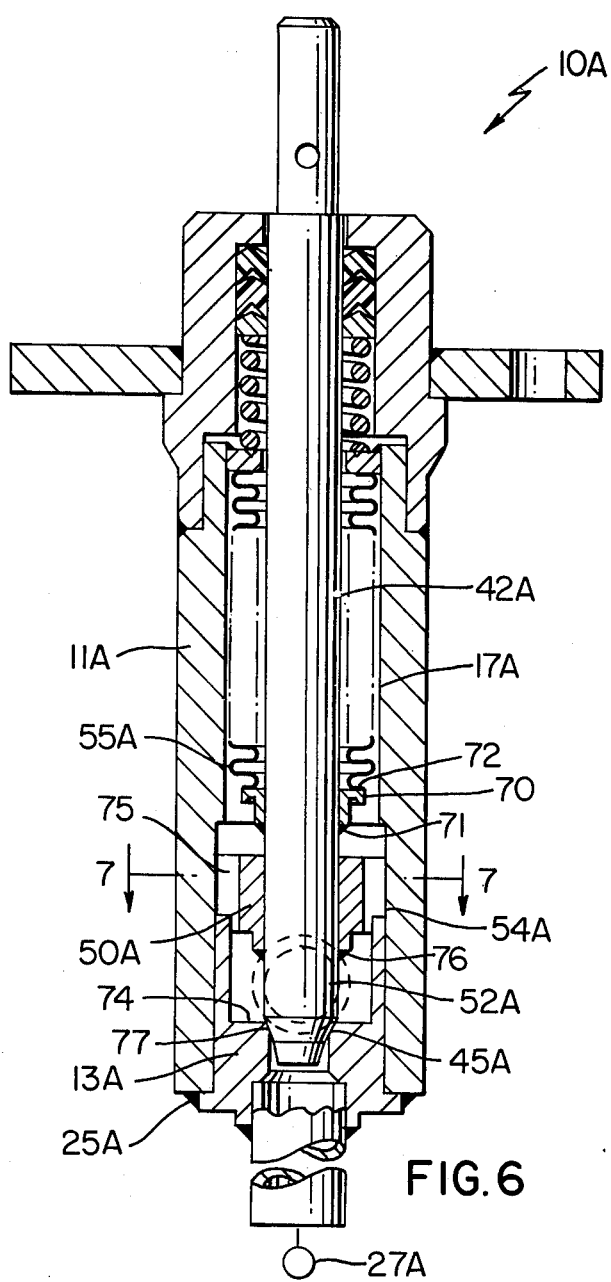
FIG. 6 is a view similar to FIG. 2 and illustrates another embodiment of the valve construction of this invention.
Figure 7:
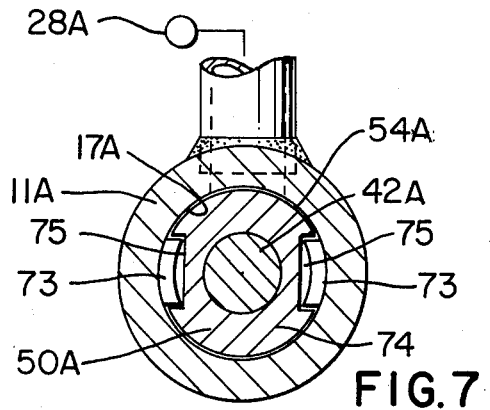
FIG. 7 is a cross-sectional view taken on line 7—7 of FIG. 6.
Figure 8:
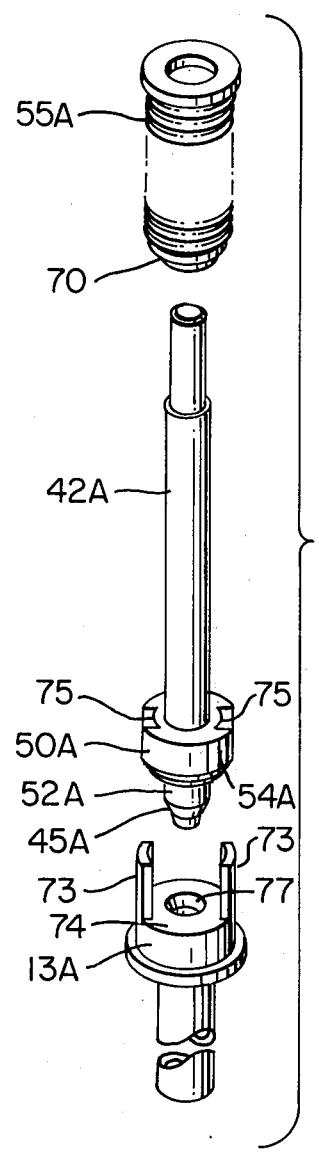
FIG. 8 is an exploded perspective view of various parts of the valve construction of FIG. 6.

Another valve construction of this invention is generally indicated by the reference numeral 10A in FIGS. 6-8 and parts thereof similar to the valve construction 10 previously described are indicated by like reference numerals followed by the reference letter "A".

As illustrated in FIGS. 6-8, the valve construction 10A is substantially the same as the valve construction 10 previously described except that the lower end of the bellows construction 55A is not extruded and is closed off by an annular retainer 70 that is welded at 71 to the valve stem 42A as well as welded to the lower end 72 of the bellows construction 55A.

Also, the valve construction 10A differs from the valve construction 10 previously described in that a different valve seat member 13A and guide collar 50A are utilized so that the lower end 52A of the valve stem 42A can be uniform throughout its length, except at the conical seating surface 45A thereof, and so that rotational movement of the valve stem 42A and, thus, the collar 50A cannot take place relative to the housing means 11A even though axial movement is permitted therebetween as previously described. Thus, excessive external torque cannot be applied through the valve stem 42A to the bellows seal to damage the same.

In particular, the valve seat member 13A has a pair of spline members 73 formed integrally therewith and extending upwardly from the upper surface 74 thereof. The spline members 73 are arcuate in cross section as illustrated in FIG. 7 to engage against the arcuate peripheral surface of the stepped bore 17A as well as be respectively received in cooperating slots 75 formed in the outer peripheral surface 54A of the guide collar 50A as illustrated in FIGS. 6 and 7. In this manner, the valve stem and guide collar 50A that is secured thereto, such as by welding at 76, are permitted to move axially relative to the housing means 11A so that the frustoconical valve surface 45A thereof can cooperate with a frustoconical valve seat 77 formed in the valve member 13A for controlling fluid flow in the manner previously described between the fluid source 27A and the controlled device 28A while rotational movement of the valve stem 42A and guide collar 50A relative to the housing means 11A is prevented as the valve seat member 13A is fixed to the housing means 11A by the previously described weld means 25A.

Thus, it can be seen that the valve construction 10A of this invention operates in the same manner as the valve construction 10 previously described and such operation thereof need not be repeated.

While one form of guide collar 50A is illustrated as being splined to the spline members 73 of the valve seat member 13A, it is to be understood that the guide collar 50A could be modified to any desired configuration thereof as long as the slots 75 thereof operate with the spline member 73 in the manner previously described. For example, the collar 50A could comprise merely a disc secured to the valve stem 42A and having the guide slots 75 formed therein in the same configuration as the guide slots 75 illustrated in the drawings.

Also other parts of the valve construction 10A could be modified from the structure previously described in connection with the valve construction 10 previously described. For example, the gap 39 in the annular weld 36 of the valve construction 10A could be eliminated if desired.

Accordingly, it can be seen that this invention not only provides improved valve constructions, but also this invention provides improved methods of making such valve constructions or the like.

While the forms and methods of this invention now preferred have been described and illustrated as required by the Patent Statute, it is to be understood that other forms and method steps can be utilized and still come within the scope of the appended claims.

What is claimed is:

1. A method of making a valve construction comprising the steps of forming a housing means with an inlet and an outlet interconnected together by a valve seat of said housing means, disposing a movable valve member in said housing means for opening and closing said valve seat, forming said valve member with an elongated and integral valve stem extending from one side thereof whereby said valve member and said valve stem are one-piece, forming said housing means with axially spaced guide means to provide the sole means for guiding axial movement of said valve stem, disposing a guide collar means on said valve stem closely adjacent said valve member to cooperate with one of said guide means of said housing means, forming said guide collar means to extend radially outwardly from said valve stem and be larger than said valve member, forming said guide collar means and said one guide means of said housing means with limiting means that permits axial movement of said guide collar means relative to said one guide means while preventing rotational movement therebetween, forming said limiting means of said guide collar means as a plurality of slots in said guide collar means, forming said limiting means of said one guide means as a plurality of spline members to be respectively received in said slots of said guide collar means, forming said valve seat as a separate valve seat member carried by said housing means, and forming said valve seat member to carry said spline members.

2. A method of making a valve construction as set forth in claim 1 and including the step of forming said spline members and said valve seat member as a one-piece construction.

* * * * *